United States Patent
Semouchine et al.

(10) Patent No.: US 10,168,965 B2
(45) Date of Patent: Jan. 1, 2019

(54) PRINTING SYSTEM FOR PRINTING A PLURALITY OF IMAGES ON A WEB AND A METHOD THEREOF

(71) Applicant: Océ Holding B.V., Venlo (NL)

(72) Inventors: Lioudmila Semouchine, Chatenay Malabry (FR); Vincent Leymarie, Montreuil (FR); Benjamin Vouhe, Brunoy (FR); Christian Tremblay, Mantes la Ville (FR)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/723,831

(22) Filed: Oct. 3, 2017

(65) Prior Publication Data

US 2018/0101339 A1 Apr. 12, 2018

(30) Foreign Application Priority Data

Oct. 11, 2016 (EP) .................................... 16193315

(51) Int. Cl.
  *B41J 2/165* (2006.01)
  *G06F 3/12* (2006.01)
  (Continued)

(52) U.S. Cl.
  CPC ........... *G06F 3/1219* (2013.01); *B41J 11/663* (2013.01); *G06F 3/1208* (2013.01);
  (Continued)

(58) Field of Classification Search
  None
  See application file for complete search history.

(56) References Cited

U.S. PATENT DOCUMENTS

2016/0275387 A1  9/2016  Kanno

FOREIGN PATENT DOCUMENTS

EP  2 857 955 A1  4/2015
WO  WO 2015/039991 A1  3/2015

OTHER PUBLICATIONS

Search Report for European Patent Application No. 16193315, completed on Apr. 27, 2017.

*Primary Examiner* — Alejandro Valencia
(74) *Attorney, Agent, or Firm* — Birch, Stewart, Kolasch & Birch, LLP

(57) ABSTRACT

The invention relates to a printing system for printing a plurality of images on a web. The printing system comprises a print engine, a feeder for feeding the web to the print engine in a feed direction relative to said print engine, a receiver for receiving the printed web, a user interface configured to set a printing arrangement of the plurality of images on the web and to input the print engine, the feeder and the receiver for performing printing according to the printing arrangement by ejecting or adhering marking material on the web and a scheduling module for scheduling the plurality of images on the web.

The printing system comprises in storage a media list of media types. Each media type in the list is provided with at least one predetermined distance. The scheduling module is configured to move an image of the plurality of images in the printing arrangement from an originally planned location of the web to a new location of the web such that a distance of the new location to an end of the web, which end is closest to the originally planned location, is larger than the at least one predetermined distance. Also a method for such a printing system is revealed.

14 Claims, 10 Drawing Sheets

(51) Int. Cl.
*B41J 11/66* (2006.01)
*G06K 15/16* (2006.01)
*G06K 15/02* (2006.01)
*G06K 15/00* (2006.01)

(52) U.S. Cl.
CPC .......... *G06F 3/1251* (2013.01); *G06F 3/1256* (2013.01); *G06K 15/022* (2013.01); *G06K 15/16* (2013.01); *G06K 15/1885* (2013.01); *G06K 15/404* (2013.01)

| Media Type Input roll | Threshold THR(end) | Threshold THR(begin) | Image content | Finishing Action | Print Mode |
|---|---|---|---|---|---|
| 10001 | 2A | B | Drawing | Wrap up | Economy |
| 10001 | A | B | Text | Wrap up | Economy |
| 10001 | 2A | B | Drawing | Laminating | Economy |
| 10001 | A | B | Text | Laminating | Economy |
| 10001 | 4A | 4B | Drawing | Wrap up | Presentation |
| 10001 | 2A | 2B | Text | Wrap up | Presentation |
| 10001 | 4A | 4B | Drawing | Laminating | Presentation |
| 10001 | 2A | 2B | Text | Laminating | Presentation |
| 20004 | 6A | 5B | Drawing | Laminating | Presentation |
| 20004 | A | B | Text | Cutting + Laminating | Economy |

Fig. 4

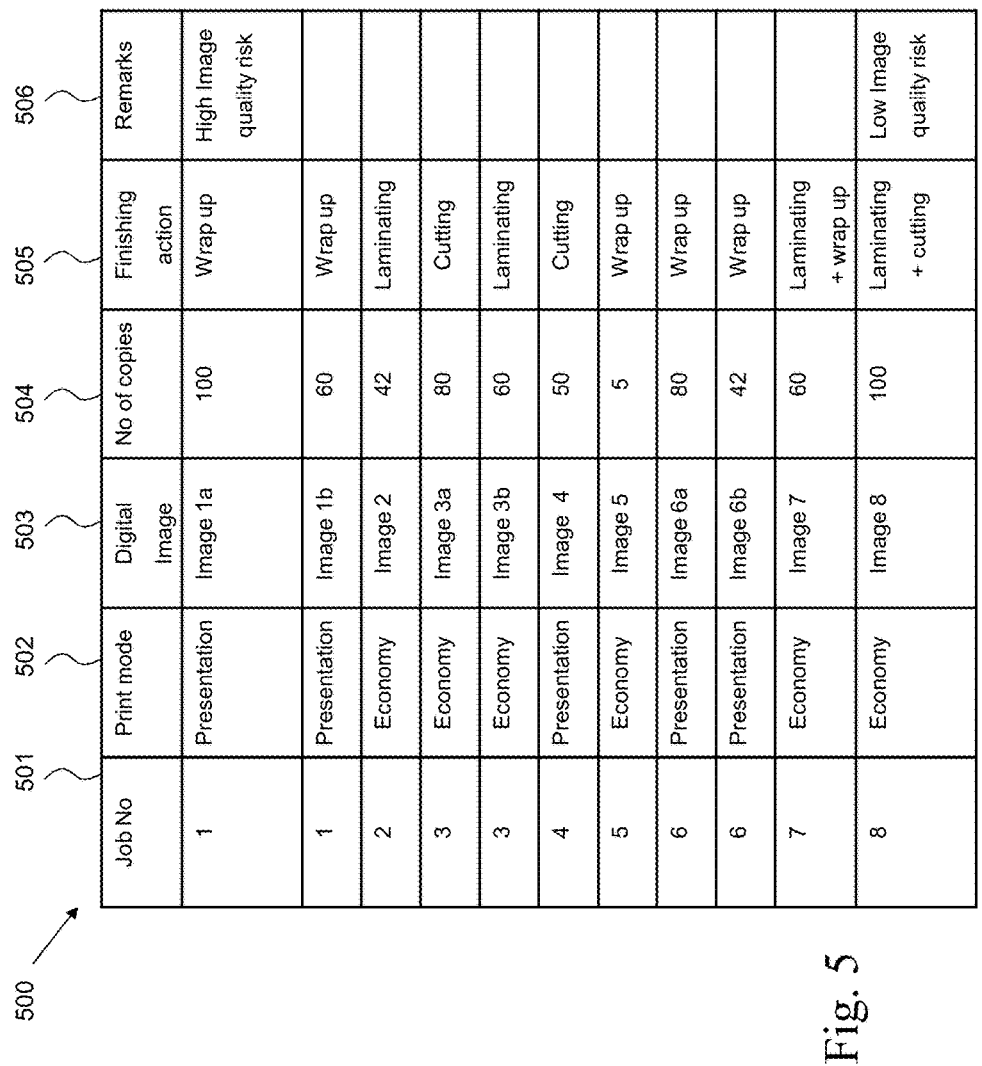

Fig. 5

| Job No | Print mode | Digital Image | No of copies | Finishing action | Remarks |
|---|---|---|---|---|---|
| 1 | Presentation | Image 1a | 100 | Wrap up | High Image quality risk |
| 1 | Presentation | Image 1b | 60 | Wrap up | |
| 2 | Economy | Image 2 | 42 | Laminating | |
| 3 | Economy | Image 3a | 80 | Cutting | |
| 3 | Economy | Image 3b | 60 | Laminating | |
| 4 | Presentation | Image 4 | 50 | Cutting | |
| 5 | Economy | Image 5 | 5 | Wrap up | |
| 6 | Presentation | Image 6a | 80 | Wrap up | |
| 6 | Presentation | Image 6b | 42 | Wrap up | |
| 7 | Economy | Image 7 | 60 | Laminating + wrap up | |
| 8 | Economy | Image 8 | 100 | Laminating + cutting | Low Image quality risk |

| Job No | Print mode | Digital Image | No of copies | Finishing action | Remarks | THR(end) | THR(begin) |
|---|---|---|---|---|---|---|---|
| 1 | Presentation | Image 1a | 100 | Wrap up | High Image quality risk | 4A | 4B |
| 1 | Presentation | Image 1b | 60 | Wrap up | | 2A | 2B |
| 2 | Economy | Image 2 | 42 | Laminating | | 2A | B |
| 3 | Economy | Image 3a | 80 | Cutting | | A | B |
| 3 | Economy | Image 3b | 60 | Laminating | | A | B |
| 4 | Presentation | Image 4 | 50 | Cutting | | A | B |
| 5 | Economy | Image 5 | 5 | Wrap up | | 2A | B |
| 6 | Presentation | Image 6a | 80 | Wrap up | | 2A | 2B |
| 6 | Presentation | Image 6b | 42 | Wrap up | | 4A | 4B |
| 7 | Economy | Image 7 | 60 | Laminating + wrap up | | 2A | B |
| 8 | Economy | Image 8 | 100 | Laminating + cutting | Low Image quality risk | A | B |

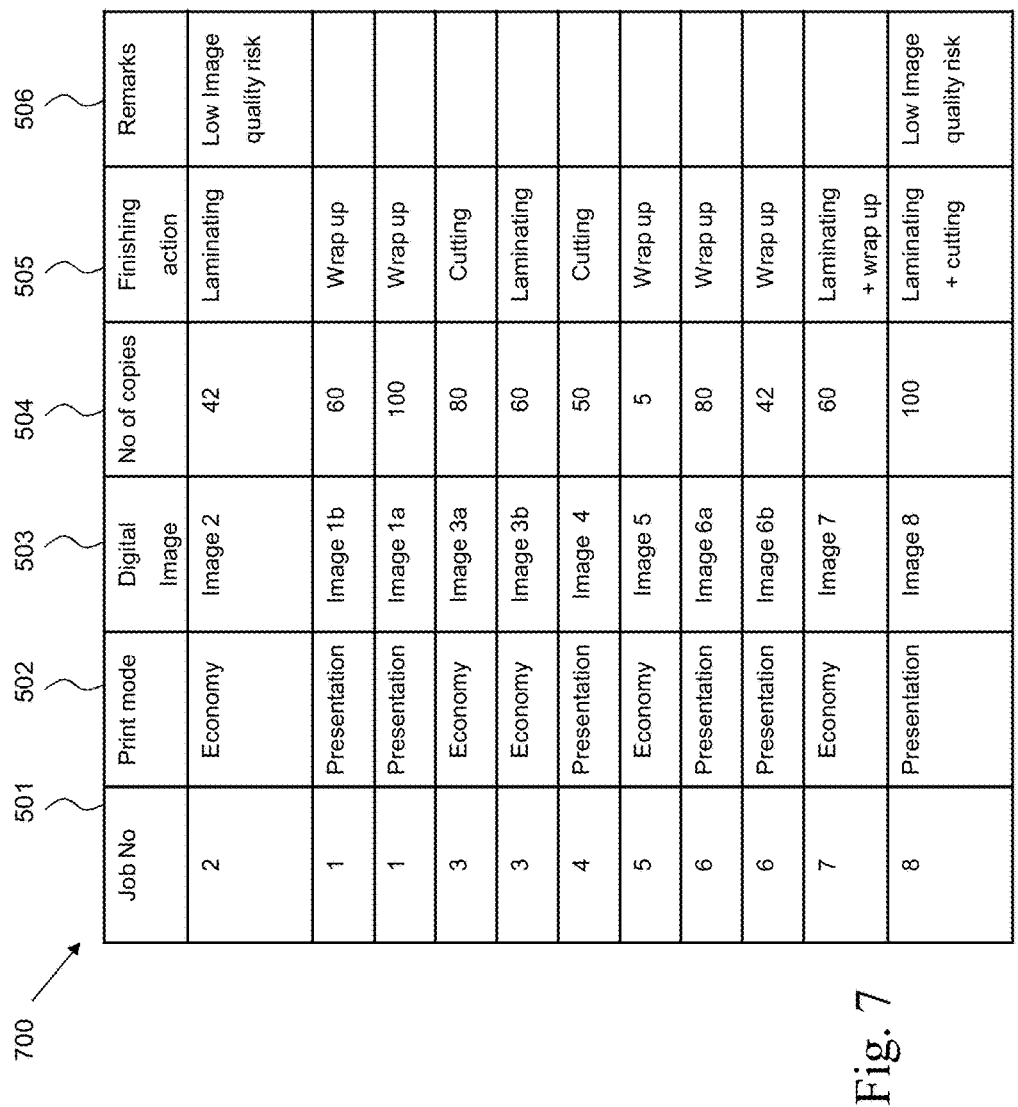

| Job No 501 | Print mode 502 | Digital Image 503 | No of copies 504 | Finishing action 505 | Remarks 506 |
|---|---|---|---|---|---|
| 2 | Economy | Image 2 | 42 | Laminating | Low Image quality risk |
| 1 | Presentation | Image 1b | 60 | Wrap up | |
| 1 | Presentation | Image 1a | 100 | Wrap up | |
| 3 | Economy | Image 3a | 80 | Cutting | |
| 3 | Economy | Image 3b | 60 | Laminating | |
| 4 | Presentation | Image 4 | 50 | Cutting | |
| 5 | Economy | Image 5 | 5 | Wrap up | |
| 6 | Presentation | Image 6a | 80 | Wrap up | |
| 6 | Presentation | Image 6b | 42 | Wrap up | |
| 7 | Economy | Image 7 | 60 | Laminating + wrap up | |
| 8 | Presentation | Image 8 | 100 | Laminating + cutting | Low Image quality risk |

| Digital Image | THR (end) | THR (begin) |
|---|---|---|
| Image 5 | 2A | 1B |
| Image 7 | 2A | 1B |
| Image 2 | 2A | 1B |
| Image 3a | 1A | 1B |
| Image 3b | 1A | 1B |
| Image 4 | 1A | 1B |
| Image 8 | 1A | 1B |
| Image 6a | 2A | 2B |
| Image 1b | 2A | 2B |
| Image 6b | 4A | 4B |
| Image 1a | 4A | 4B |

1100

| Digital Image | THR (end) | THR (begin) |
|---|---|---|
| Image 1a | 4A | 4B |
| Image 6b | 4A | 4B |
| Image 5 | 2A | 1B |
| Image 7 | 2A | 1B |
| Image 2 | 2A | 1B |
| Image 1b | 2A | 2B |
| Image 6a | 2A | 2B |
| Image 3a | 1A | 1B |
| Image 3b | 1A | 1B |
| Image 4 | 1A | 1B |
| Image 8 | 1A | 1B |

1200

| Digital Image | THR (end) | THR (begin) |
|---|---|---|
| Image 5 | 2A | 1B |
| Image 7 | 2A | 1B |
| Image 2 | 2A | 1B |
| Image 3a | 1A | 1B |
| Image 1b | 2A | 2B |
| Image 6a | 4A | 4B |
| Image 6b | 4A | 4B |
| Image 1a | 2A | 2B |
| Image 3b | 1A | 1B |
| Image 4 | 1A | 1B |
| Image 8 | 1A | 1B |

Fig. 10

PRINTING SYSTEM FOR PRINTING A PLURALITY OF IMAGES ON A WEB AND A METHOD THEREOF

FIELD OF THE INVENTION

The invention is in the field of printing systems for printing a plurality of images on a web when said web is fed to a printer head. It further relates to the field of methods for printing a plurality of images on the web.

BACKGROUND OF THE INVENTION

The invention relates to a printing system for printing a plurality of images on a web, the printing system comprising a print engine, a feeder for feeding the web to the print engine in a feed direction relative said print engine, a receiver for receiving the printed web, a user interface configured to set a printing arrangement of the plurality of images on the web and to input the print engine, the feeder and the receiver for performing printing according to the printing arrangement by ejecting or adhering marking material on the web; and a scheduling module for scheduling the plurality of images on the web. The printing system may be an inkjet printing system or a toner printing system.

Printing systems for printing a plurality of images on a web are known in the art. The printing systems comprise a print engine and feed means for feeding the web to the print engine in a feed direction. The printing systems also comprise a user interface that allows an operator to arrange the plurality of figures in a printing arrangement. The printing arrangement comprises a print queue of digital images to be printed. In the printing arrangement the images of said plurality are arranged adjacent to each other along the feed direction on the web to set printing. In general, the printing arrangement can be seen in a display screen of the user interface. Then, said user interface inputs the print engine and the feed means to perform printing on the web according to the printing arrangement as said web is leaded to the print engine.

Usually the web is extracted from an input roll which is loaded in an input module of the printing system. In order to save web, the plurality of images are usually arranged on the web close to each other along the feed direction. The print engine is configured to eject marking material like ink or toner on the web according to the printing arrangement. The images to be printed are distributed along the web. While the images scheduled for the web are printed by means of the marking material ejection on the web, the web is received by a receiving module of the printing system in order to establish an output roll in case the receiving module is an output roll module or cut sheets in case the receiver is a cutter. A core of the input roll and a core of the output roll may be loaded in the input roll module and in the receiving module respectively. In case of post-processing of the output roll, it is desired that the post-processing steps can be executed without loss of a print quality of the end product.

Receiving material is also referring to as "media" or "print media" in this description of the patent application.

A first problem with respect to the print quality of images printed from an input roll is the well-known print curl effect. A consequence of a print curl effect may be a finishing problem in a finisher which is intended to post-process a printed web, for example a laminating device. The print curl effect may cause a paper jam in the finisher or print quality issues during a finishing step of the finisher. For example, bubbling issues or orange peel issues may be generated during lamination.

A second problem with respect to the print quality of images printed from an input roll is that the receiving material is cambered when approaching the end of the input roll. When the receiving material is not completely flat on a print surface, paper step errors, bi-directional errors and banding errors may occur. This may especially impact an image with a high-density coverage or for a print mode where a ratio of quality versus production is hardest to be achieved. Typically is a production print mode for which the operator expects a good enough quality, but at a high speed. Also a presence within margins of areas of an image of certain flat colors make the image more subject to banding print artifacts. The camber of the receiving material may depend on a media type and even on a history of the input roll. A roll which suffered humidity or temperature changes may have a longer, stiffer cambered part than when the roll is new.

In general, images are printed on the web in an order of arrival at the controller of the printing system. Some images may involve a higher risk of finishing quality if they are located in the first part of the input roll—the starting point of printing on the web—and/or on the last part of the input roll—the ending point of printing on the web.

It is an object of the present invention to use a maximum of the receiving material when printing and not to be forced to throw away a first or last part of the web due to risks on print quality.

DETAILED DESCRIPTION OF THE INVENTION

To this end, a first aspect of the invention relates to a printing system as described here-above, wherein the printing system comprises in storage a media list of media types, each media type in the list provided with at least one predetermined distance, and the scheduling module is configured to move an image of the plurality of images in the printing arrangement from an originally planned location of the web to a new location of the web such that a distance of the new location to an end of the web, which end is closest to the originally planned location, is larger than the at least one predetermined distance. The at least one predetermined distance will also be referred to a threshold distance.

Per media type at least one predetermined distance is stored. An image that is planned to be printed on a web with a distance to an end of the input roll, is checked against some criteria which will be elucidated in further embodiments. The criteria define a risk of print quality issues. When a risk is identified, the image is reshuffled in the print queue to ensure that the image at risk will be printed on the web at a distance which is larger than the at least one predetermined distance.

It is important to be noted that the printing system may be a printer as known in the art, such as a roll to roll printer or a roll to sheet printer including a cutter, further comprising the scheduling module which is configured according to the invention. The scheduling module may be incorporated or attached to the printer or in signal communication with it. The scheduling module may comprise a hardware device, a software program, an electronic circuit or combinations thereof for displaying the plurality of printing arrangements and for cooperating with the user interface to change printing arrangement and to start and stop printing.

The display screen may be arranged in a touch-screen for allowing touch-selection of the printing arrangement from a plurality of printing arrangements. In this way, one printing arrangement can be easily selected.

The images in a printing arrangement may be moved relative to the displayed web of the printing arrangement whose printing is not yet started for a change of the printing arrangement. In this way, the printing system provides a change in a printing arrangement in a more simple way. Further, the display screen may be smaller.

According to an embodiment the scheduling module is configured to rearrange the image after a warning and/or advice is communicated to an operator of the printing system by means of the user interface of the printing system.

According to an embodiment the at least one predetermined distance is out of a group of a predetermined distance with respect to an end of the web at which printing is started and a predetermined distance with respect to an end of the web at which printing is ended. In case of an input roll—in a roll to sheet printing system or a roll to roll printing system—a first predetermined distance is defined for the end of the input roll taking into account the media type of the input roll. In case of an output roll—in a roll to roll printing system—a second predetermined distance is defined for the beginning of the input roll taking into account the media type of the input roll which is also the media type of the output roll.

According to an embodiment the at least one predetermined distance for a media type is defined per finishing action which is applicable to the printed image after printing. For example, a laminating action after printing on the web may need another distance then a cutting action after printing on the web.

According to an embodiment the at least one predetermined distance for a media type is defined per print mode of the printing system which is applicable to the printed image during printing. An inkjet printing system may for example have two print modes, an economy print mode and a presentation print mode. The economy print mode has less passes over an area of the web than a presentation print mode and thus a lower print quality.

According to an embodiment the at least one predetermined distance for a media type is defined per image content type of the image to be printed. An image content type may be text, pictures, drawings or a mix of these image content types.

According to an embodiment the scheduling module is configured to move the image of the plurality of images in the printing arrangement from an originally planned location of the web to a new location of the web such that a distance of the new location to each end of the web is larger than the corresponding predetermined distance. By doing so, it is assured that the new location at which the image is going to be printed is risk free from risks at both ends of the web.

According to an embodiment the receiver is one out of a group of a wrap up unit for wrapping up the web to form an output roll and a cutter for cutting the web into sheets.

According to an embodiment the at least one predetermined distance is linearly dependent of a diameter of an input roll comprising the web. The web is unwrapped from the input roll and lead to the feeder. The dependency is linear in a mathematical sense since a number of receiving material layers on an input roll which is in contact with external conditions depends on the diameter of the input roll.

The invention also relates to a method for printing a plurality of images with a printing system comprising a print engine, the method comprising the steps of setting an arrangement of the plurality of images on the web in a printing arrangement, feeding the web to the print engine in a feed direction relative to said print engine for performing printing according to the printing arrangement, receiving the printed web in a receiver of the printing system, wherein the printing system comprises in storage a media list of media types, each media type in the list provided with at least one predetermined distance, and the method further comprises the step of moving an image of the plurality of images in the printing arrangement to a location of the web before printing of the image such that a distance of the location of the web to a closest end of the web is larger than the at least one predetermined distance, wherein the at least one predetermined distance is out of a group of a predetermined distance with respect to an end of the web at which printing is started and a predetermined distance with respect to an end of the web at which printing is ended. The media type of the receiving material at which the plurality of images is planned to be printed is known to the printing system, for example by means of a print job ticket or other available print data. The media type is selected from the media list of media types according to the invention, and the at least one predetermined distance is retrieved and used for determining a move of an image to a risk-free part of the web.

Finally, a third aspect of the invention relates to a non-transitory recording medium comprising computer-executable program code configured to instruct a scheduling module of a printing system as described here-above and/or a computer to perform a method as described here-above.

BRIEF DESCRIPTION OF THE DRAWINGS

For the purpose of illustrating the invention, the drawings show aspects of one or more embodiments of said invention. However, it should be understood that the present invention is not limited to the precise arrangements and instrumentalities shown in the drawings, wherein:

FIG. 4 schematically shows a media list according to the invention;

FIG. 5 schematically shows a first printing arrangement comprising a print queue according to the invention;

FIG. 6 schematically shows a second printing arrangement comprising a print queue according to the invention;

FIG. 7 schematically shows a printing arrangement comprising a print queue according to the invention after applying the method according to the invention;

FIG. 10 shows ordered print queues based on the threshold distances according to an embodiment of the method according to the invention.

It is noted that the same reference numerals have been used to identify the same or similar elements throughout the several views.

DETAILED DESCRIPTION OF EMBODIMENTS

According to an embodiment the receiver of the printing system according to the invention is a wrap up unit for wrapping up the web to form an output roll. An example of such a printing system is shown in FIG. 1.

Figure 1:
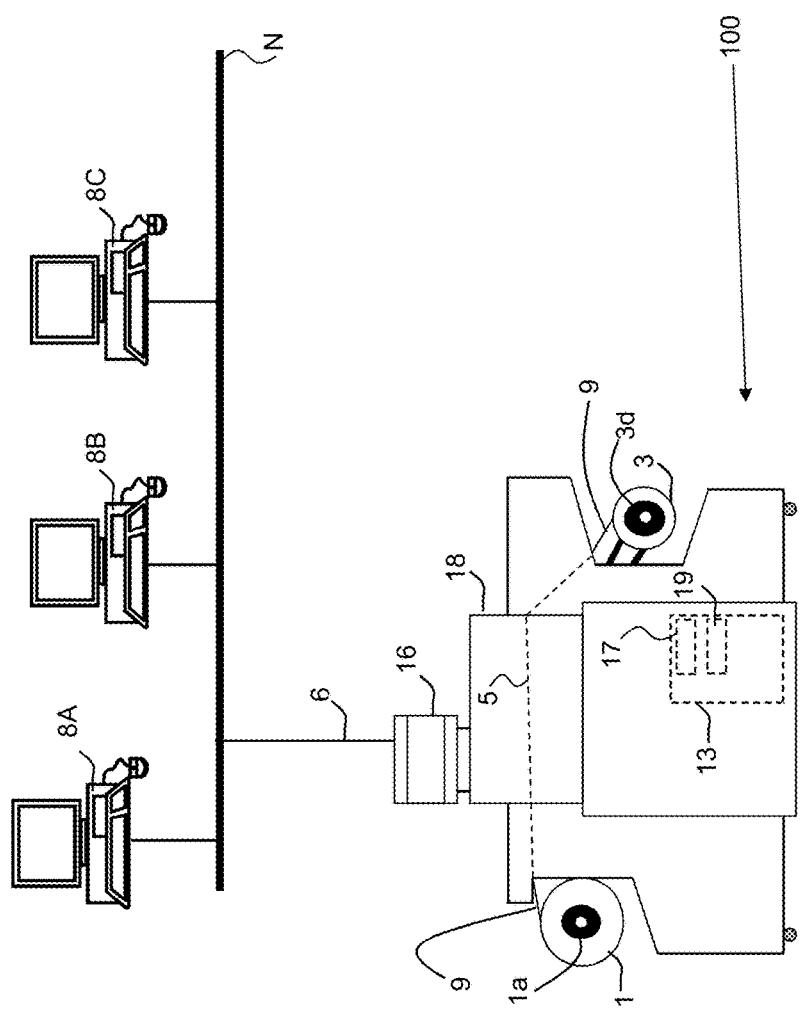
FIG. 1 schematically shows a roll-to-roll printing system according to the invention.

FIG. 1 shows a roll-to-roll printing system 100 connected to a network N. The roll-to-roll printing system 100 is available for a user working with one of the workstations 8A-8C and intending to send a digital image from one of the workstations 8A-8C to a controller 13 inside of the roll-to-roll printing system 100. The roll-to-roll printing system 100 is connected to the network N via wired or wireless connecting means 6 and suited for receiving digital images from the workstations 8A-8C. The network N may be wireless.

The roll-to-roll printing system 100 comprises a feeder for feeding a web 9 to the print engine 18 in a feed direction relative to a print engine 18. The feeder comprises an input holder 1a for a media input roll 1. The media input roll 1 may be unwound, printed upon and rewound on a receiver for receiving the printed web 9. The receiver comprises an output holder 3d arranged to form a printed media output roll 3.

The roll-to-roll printing system 100 comprises a user interface 16 suitable for displaying the print queue according to the invention by means of digital images to be printed, a digital representations of digital images intended to be printed on the roll 1, 3. The user interface 16 is configured to set a printing arrangement of the plurality of images on the web 9 and to input the print engine 18, the feeder and the receiver for performing printing according to the printing arrangement by ejecting marking material on the web 9.

The controller 13 controls the printing process and data transfer between the controller 13 and the user interface 16. The controller 13 comprises a digital storage 17 for storing a media list of media types. Each media type in the list is provided with at least one predetermined distance. The controller 13 comprises a scheduler 19 for scheduling the digital images submitted to the roll-to-roll printing system 100 in the print queue according to the invention. The scheduler 19 is configured to move an image of the plurality of images in the printing arrangement from an originally planned location of a web 9 to a new location of the web 9 such that a distance of the new location to an end of the web 9, which end is closest to the originally planned location, is larger than the at least one predetermined distance.

According to another embodiment the controller 13 of the roll-to-roll printing system 100 is integrated in one of the workstations 8A-8C. In another embodiment a user interface is provided as a network web site or intranet site that is accessible with a browser on one of the workstations 8A-8C.

The controller 13 is suited to store a set of digital images, to check whether or not the digital images can be printed and to submit a digital image to a print engine 18 of the roll-to-roll printing system 100 in order to be printed the web 9 unwound from the input roll 1. Image data of a digital image are stored in the digital storage 17 in the controller 13 at least for the time period that the digital image is printed by the print engine 18. Image data may also be stored in memory of at least one of the workstations 8A-8C.

The roll-to-roll printing system 100 processes at least part of media on the input roll 1. The wound media has a length which is defined as a largest dimension of the media when unrolled. Media material may be paper, textile, transparent sheet material, plastic or any other kind of material or substrate suitable for winding up on the input roll. Individual digital images will be printed on the web 9 given out of the input roll 1. The individual digital images are printed by the print engine 18 of the roll-to-roll printing system 100 according to the print queue. The web 9 of the input roll 1 is guided along a paper path 5 from the input holder 1a to the output holder 3d of the output roll 3. The print engine 18 is ejecting or adhering marking material on the web 9 to form the printed digital images. The printed web 9 is guided to and wound up on the output holder 3d of the output roll 3.

The roll-to-roll printing system 100 in FIG. 1 comprises one input holder and one output holder. However, roll-to-roll printing systems comprising a plurality of input holders and/or a plurality of output holders may be envisioned to be configured to execute the method according to the present invention.

According to an embodiment the receiver of the printing system according to the invention is a cutter for cutting the web into sheets.

Figure 2:
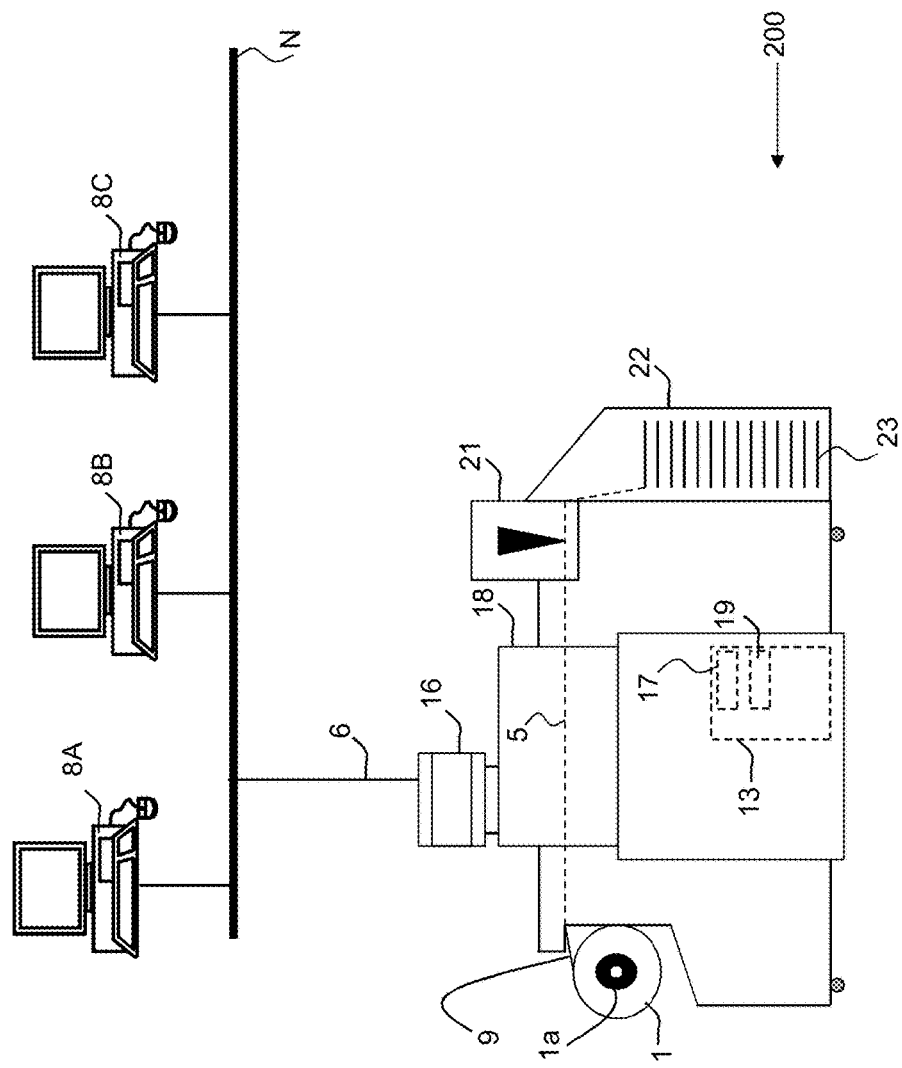
FIG. 2 schematically shows a roll-to-sheet printing system according to the invention.

FIG. 2 shows a roll-to-sheet printing system 200 connected to a network N. The roll-to-sheet printing system 200 is available for a user working with one of the workstations 8A-8C and intending to send a digital image from one of the workstations 8A-8C to a controller 13 inside of the roll-to-sheet printing system 200. The roll-to-sheet printing system 200 is connected to the network N via wired or wireless connecting means 6 and suited for receiving digital images from the workstations 8A-8C. The network N may be wireless. The roll-to-sheet printing system 200 comprises an input holder 1a for a media input roll 1 which may be unwound, printed upon by a print engine 18 and guided along a paper path 5 to a cutter 21 configured to cut the web 9 into sheets 23. The sheets 23 are lead to an output holder 22 in which the sheets 23 form a pile of sheets 23. The controller 13 resembles the controller 13 in FIG. 1 except that the controller 13 in FIG. 2 is also configured to control the cutter 21.

The roll-to-roll printing system 200 in FIG. 1 comprises one input holder 1a and one finishing module, cutter 21. However, roll-to-roll printing systems comprising a plurality of input holders and/or a plurality of finishing modules, for example a laminator, a cutter, a binder, etc., may be envisioned to be configured as a printing system according to the invention and configured to execute the method according to the present invention.

Figure 3:
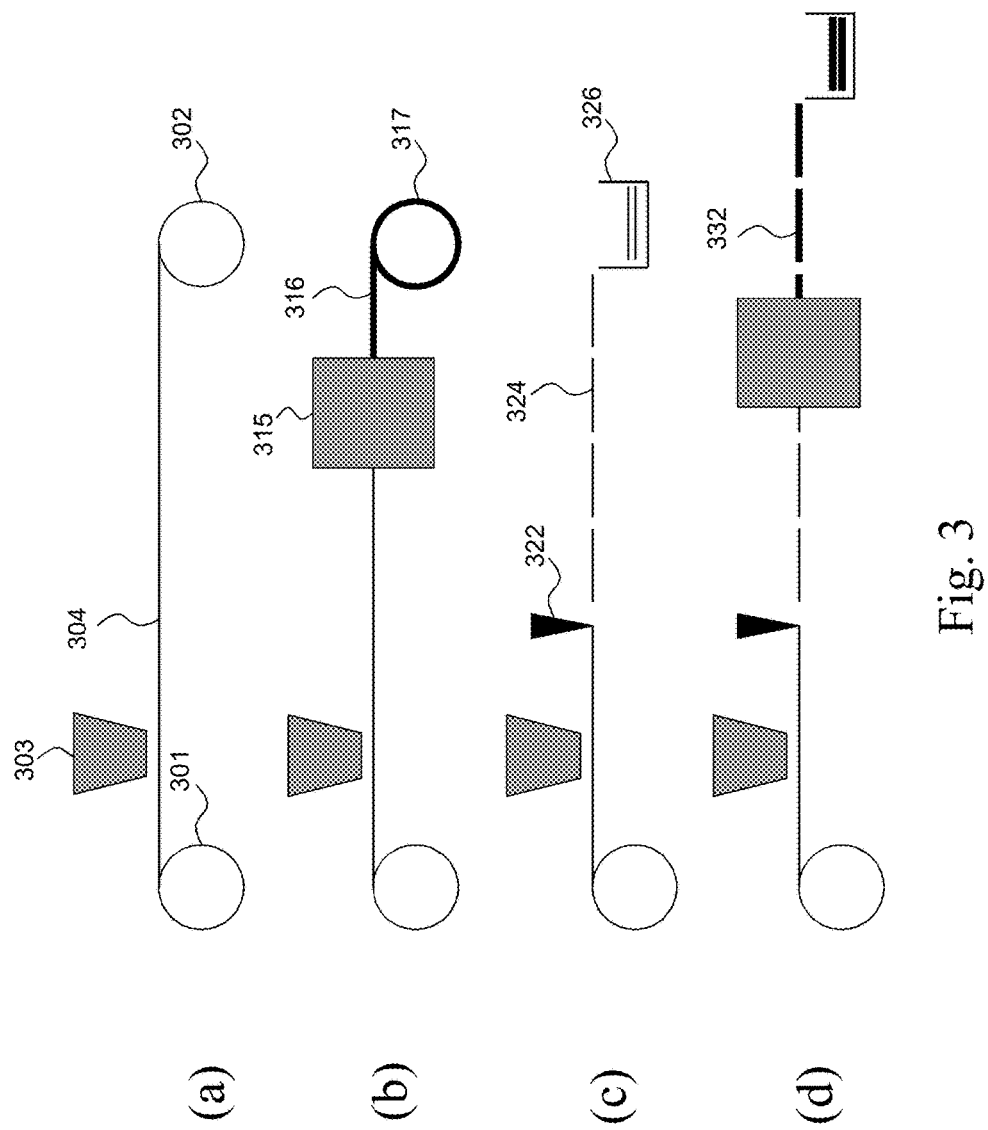
FIG. 3 schematically shows printing systems according to the invention.

FIG. 3 schematically shows non-limiting examples of configurations 3a-3d of a printing system according to the invention.

FIG. 3a shows a printing system comprising an input roll holder 301 from which a web 304 is unwound and guided along a print engine 303 to an output roll 302.

FIG. 3b shows a printing system comprising an input roll holder from which a web is unwound and guided along a print engine to a laminator 315. The laminator laminates the web forming a laminated web 316 which is wrapped up on an output roll 317.

FIG. 3c shows a printing system comprising an input roll holder from which a web is unwound and guided along a print engine to a cutter 322. The cutter 322 cuts the web into sheets 324 which are guided to an output tray 326 to pile up the sheets 324.

FIG. 3d shows a printing system comprising an input roll holder from which a web is unwound and guided along a print engine to a cutter. The cutter cuts the web into cut sheets which are guided to a laminator. The laminator laminates the sheets to form laminated sheets 332 which are guided to an output tray to pile up the laminated sheets 332.

FIG. 4 schematically shows a non-limiting example of an internal storage representation 400 of the media list in the digital storage on the controller of the printing system according to the invention. The media list 400 comprises six columns 401-406, but a media list with less or more columns may be envisioned.

A first column 401 indicates identification numbers 10001, 20004 of the media types of the input rolls. For example, the media type with identification number 10001 concerns media with a weight of 80 g/m², while the media type with identification number 20004 concerns media with a weight of 100 g/m².

For a second column 402 and a third column 403 the following definitions are relevant.

A beginning of the roll is defined as an end of the roll which is unwound at first. An ending of the roll is defined as an end of the roll which is unwound at last.

A second column 402 indicates a first threshold distance THR (end) dedicated for the ending of the input roll according to the invention.

A third column 403 indicates a second threshold distance THR (begin) dedicated for the beginning of the input roll according to the invention. In case of a roll-to-roll system the ending of the input roll corresponds to the beginning of the output roll and the beginning of the input roll corresponds to the ending of the output roll.

For example, a roll with media type 10001 with a drawing as image content, a wrap up finishing action and an economy print mode, has a first threshold distance of 2*A and a second threshold distance 1*B, wherein A is a number of length units which is linearly dependent on the input roll diameter and B is also a number of length units which is linearly dependent on the input roll diameter. A and B may be different depending on a history of the input roll, i.e. the input roll may be exposed to different conditions like humidity, transport condition and stock duration. For example, if the diameter of the input roll is 25 cm and the factor of the linear dependency equals 5, the number of length units A equals 3.14*0.25*5 which is approximately 3.92 m. The factor for the linear dependencies of A and B can be established by experiments on the input roll.

A fourth column 404 indicates a kind of image content of images to be printed on the input roll. A kind of image may be a picture, drawing, text or a combination of at least two of the mentioned kinds.

A fifth column 405 indicates a finishing action applicable to the printed web. A finishing action may be wrapping up, cutting, folding, laminating, perforating, punching, gluing, (book) binding, etc, or a combination of at least two of the mentioned finishing actions. Also the finisher characteristics of the selected finisher may play a role.

A sixth column 406 indicates a print mode for the printing on the input roll. In case of an inkjet printer with a print head to eject ink a print mode may be an economy print with less passes of a print head over the web than a presentation print mode.

The items in the first column 401, in the fourth column 404, in the fifth column 405 and in the sixth column 406 may be compared with the corresponding items of images in the print jobs to be printed on the input roll. The corresponding items of images in the print jobs may be derived from print job specifications like a print job ticket. By comparing the items in the columns 401, 404-406 with the print job specifications, the predetermined distances may be looked up in the second column 402 and the third column 403 of the media list 400 according to the invention. According to the invention, the predetermined distances are thus differentiated to a media type 401 and to at least one out of image content 404, finishing action 406 and print mode 407.

FIG. 5 schematically shows a non-limiting example of an internal storage representation 500 of the print queue in the digital storage on the controller of the printing system according to the invention. Entries of the print queue representation 500 may be images of the print jobs. Images are intended to be printed in a sequential order on the web of at least one input roll as defined by the order of the entries in the print queue representation 500. A print job may contain more than one image to be printed on the web. In this example the print queue representation 500 comprises six columns 501-506, but more or less columns may be envisioned.

A first column 501 indicates an identification of the print job, for example a job number.

A second column 502 indicates a print mode at which the print job is intended to be printed.

A third column 503 indicates an identification of a digital image comprised in the print job mentioned in the first column 501.

A fourth column 504 indicates a number of copies of the image in the third column 503 which is scheduled to be printed.

A fifth column 505 indicates a finishing action of the web on which the digital image is going to be printed.

A sixth column 506 comprises remarks for the operator of the printing system regarding the printing and finishing of the digital image in each entry of the print queue representation 500. For example, a text or an indication for a text "high image quality risk" or "low image quality risk" may be added in the sixth column 506. Such a text or indication of the text may be used by the user interface 16 to display a warning to the operator that he is advised to move the entry of the digital image to another position in the print queue according to the invention. The printing system may also be configured to automatically generate a print queue which is risk free based on the media list according to the invention and based on the print job specifications.

For each image of each print job, a corresponding threshold distances indicated in the second column 402 and the third column 403 of the media type list 400 may be retrieved in order to be used when rescheduling the images to be printed when necessary. If the digital images 1a, 1b, 2, 3a, 3b, 4, 5, 6a, 6b, 7, 8 mentioned in the third column 503 of the print queue representation 500 are to be printed on input rolls of different media type, the print queue representation 500 may be firstly split into a print queue representation per input roll media type or even per input roll.

For convenience reasons it is assumed that the digital images 1a, 1b, 2, 3a, 3b, 4, 5, 6a, 6b, 7, 8 mentioned in the third column 503 of the print queue representation 500 are to be printed on the same media type, they may be printed on one or more input rolls of said same media type.

Moreover, for convenience reasons it is assumed that the digital images 1a, 1b, 2, 3a, 3b, 4, 5, 6a, 6b, 7, 8 mentioned in the third column 503 of the print queue representation 500 can be managed to be printed on the same input roll of said media type.

By determining the number of copies per digital image and the size in the length direction of the web of the digital image to be printed, for each digital image a calculation is applied what length of the web the printing of the digital image will cost and at what lengthwise position of the roll. The digital image indicated by the image id 1a will be printed on the beginning of the input roll. The digital image or the corresponding print job ticket may be further analyzed to determine a kind of image content like a text, a drawing or a picture. An indication in the print job ticket of a black and white copy or a color copy, or an extension of the document of the print job may be used to determine the kind of image content. Information in the second column 502 and the fifth column 505 are then used to determine the unique entry in the media list 400 which is applicable for the printing of the digital image.

FIG. 6 shows the an internal storage representation 600 of the print queue resembling FIG. 5, but now with two additional columns 507, 508 corresponding to the corresponding thresholds retrieved from the internal storage representation 400 of the media list.

Since the threshold distance for the beginning of the input roll in the column 508 of the print queue representation 600 is now determined per digital image to be printed, the determined threshold distance in column 508 for the beginning of the roll is compared to the lengthwise position of the web at which the number of copies of the digital image as indicated in the fourth column 504 of the print queue representation 600 is scheduled to be printed. For example, the digital image 1a is to be printed in a presentation mode according to the second column 502 in the print queue representation 500. Since all entries in the media list 400 having a presentation mode in the sixth column 406 have a threshold distance of at least 2B length units for the beginning of the input roll in the third column 403, the image 1a cannot be printed at the beginning of the input roll and has to be moved in the print queue towards the lengthwise middle of the input roll. Since there are entries in the media list 400 having in the column 508 a threshold distance of 1B length units, for example images 2, 3a, 3b, 4, 5, 7, 8, the images 2, 3a, 3b, 4, 5, 7, 8 are suitable for printing at the beginning of the input roll before printing of image 1a. At least one of the images 2, 3a, 3b, 4, 5, 7, 8 can be moved to the beginning of the roll in the print queue. By doing so, the image quality of the image 1a is guaranteed and also there is little waste of media at the beginning of the input roll. It is noted that in FIG. 6 B length units is the minimum threshold distance, so in this case there is a minimum of B length units at the beginning of the input roll that cannot be printed upon. In other words, in this case there will always be a waste of B length units of web.

Since the threshold distance for the end of the input roll in the column 507 of the print queue representation 600 is now determined per digital image to be printed, the determined threshold distance for the end of the roll is compared to the lengthwise position of the web at which the number of copies of the digital image as indicated in the fourth column 504 of the print queue representation 500 is scheduled to be printed. In the same way as for the beginning of the roll, a digital image can be determined to be such scheduled that the digital image is moved to the lengthwise middle of the roll. Another digital image may be moved towards the end of the roll if image quality of the print is less important.

Values for each entry in the print queue representation 500, 600 may be generated automatically from submitted print jobs comprising the digital images to be printed together with a print job ticket specifying media requirements like size, media quality, print mode, finishing action and image content specifications. Specifications of the input rolls like width and media quality are considered to be registered by the controller 13 of the printing system 100, 200 due to prior input by an operator. Specifications of the input rolls like width, roll diameter and media quality may also be registered by the controller 13 of the printing system 100, 200 by means of default values so that at a later moment in time these values may be changed by operator input via the user interface 16.

Values for each entry in the print queue representation 500, 600 may also be entered and/or changed by means of the user interface 16 of the printing system 100, 200 since the user interface 16 is capable of displaying the print queue representation 500, 600 to the operator. Also a menu may be offered to the user by means of the user interface 16 to show the media list 400 which is editable and thus maintainable by an operator of the printing system 100, 200.

FIG. 7 schematically shows an internal storage representation 700 of the print queue in the digital storage on the controller of the printing system according to the invention after the scheduler has taken the threshold distances of the beginning and the ending of the input roll into account for the submitted print jobs. Entries of the print queue are moved to less risky planned positions on the web of the input roll with regard to the threshold distances for the beginning and ending of the input roll by making use of information in the media list 400 and by making use of information in the print job tickets of the print jobs in the print queue 500. Moreover, the print jobs in the print queue representation 700 can be printed and finished with a minimum of loss of print quality as can be seen by the kind of remarks in the sixth column 506 of the print queue representation 700.

For example, in the print queue representation 700 the images 1a and 2 are swapped. Besides swapping images, also images may be moved one-by-one from the top of the print queue to the middle of the print queue, i.e. from planning at the beginning of the input roll, to a planning at a risk-free middle of the input roll.

For example, in the print queue representation 700 the images 7 and 8 are still on at their original position in the print queue. There was no need to move for example digital image 8 because digital image 8 had a threshold distance A for the ending of the input roll which is the minimum threshold distance leading to a minimum of waste at the ending of the input roll.

Images may be moved one-by-one or swapped from the bottom of the print queue to the middle of the print queue, i.e. from a planning at the ending of the input roll, to a planning at a risk-free middle of the input roll.

Instead of dragging and dropping or selecting a digital object like an image, a print queue entry or a media list entry on a screen of the user interface 16 which is a touch screen, the digital object may be selected by a mouse and moved by means of the mouse to the desired place on the screen, in the print queue representation 500, 600, 700 or in the media list representation 400 respectively. An entry in the print queue may also be dragged and dropped onto a place between two entries already positioned in the print queue representation 500, 600, 700. In this way the sequence order of entries in the print queue representation 500, 600, 700 may be changed. This is allowed as long as the print jobs corresponding to the two entries in the print queue representation 500, 600, 700 are not yet printed.

According to an embodiment of the present invention the individual digital images in the print queue representations 500, 600, 700 are represented by thumbnail images. Additional information such as the file name of the individual digital image, the last amended date of the individual digital image, the usage of each color when printing the individual digital image and an absolute end time when the printing of the individual digital image is to be completed may be part of the print queue representation 500, 600, 700.

The features to be implemented in the user interface screens as shown in FIGS. 4-7 may be combined in one user interface screen. Switch or selection buttons may be introduced on the user interface screens in order to be able to switch between the embodiments of the respective user interface screens.

Figure 8:
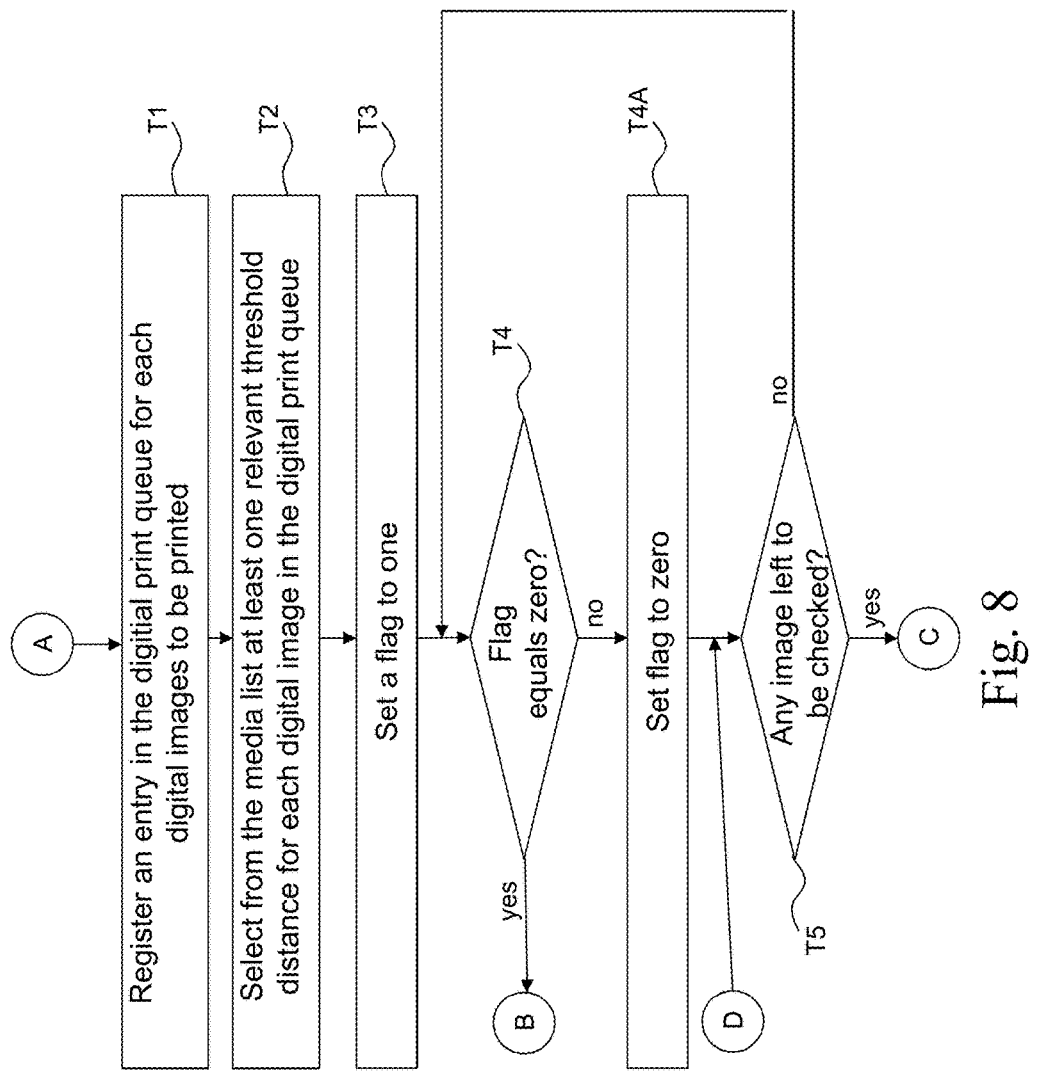
FIG. 8-9 show a flow diagram of an embodiment of the method according to the invention.
Figure 9:
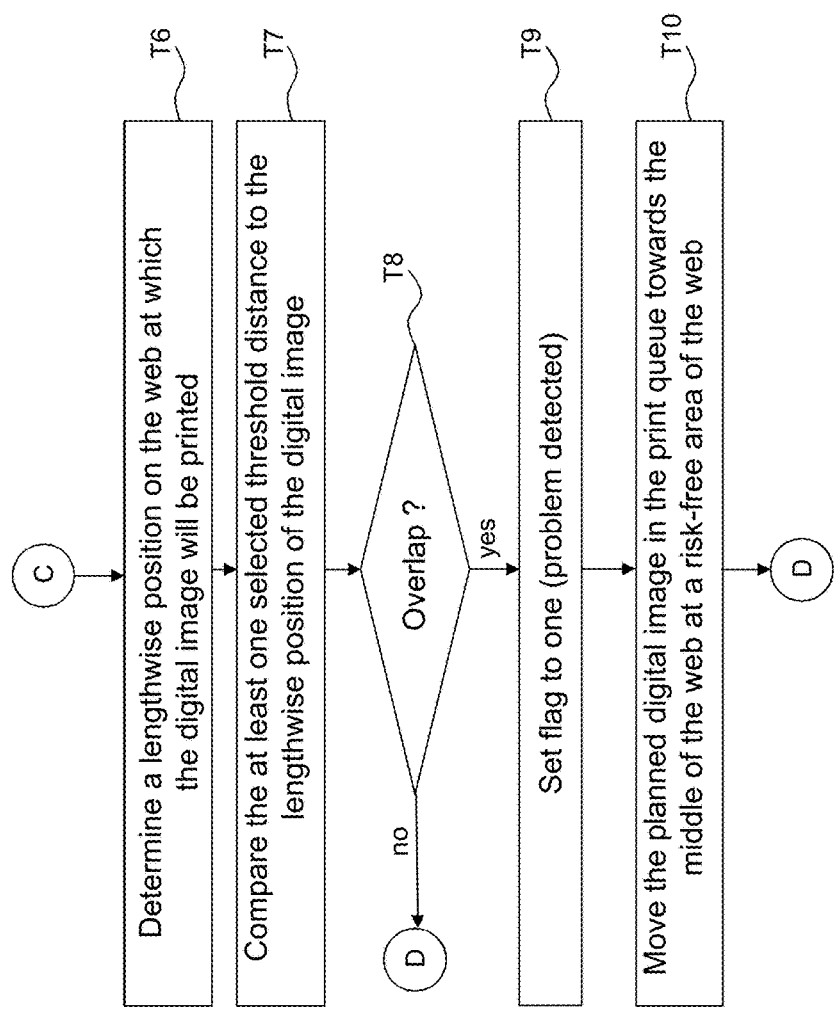

FIGS. 8-9 is a flow diagram of an embodiment of the method according to the invention. From a starting point A a first step T1 is reached.

In the first step T1 for each digital image to be printed on an input roll an entry is registered in the digital print queue. The entry comprises at least one digital item identifying the digital image and digital items of print properties of the digital image. Also digital items as mentioned in the description of FIG. 5-6 may be part of an entry.

In a second step T2 for each digital image registered in the digital print queue, at least one threshold distance according to the invention and corresponding to the digital image is selected from the media list 400 based on information from the print job ticket of the digital image intended to be printed and the media type of the input roll.

In a third step T3 a flag is set to one, i.e. meaning that there is a problem to be solved.

In a fourth step T4 it is checked if the flag equals 0. If so, the method proceeds to an end point B of the method. If not so, the flag is set to 0 (step T4A) and the method proceeds to a fifth step T5.

In a fifth step T5 it is checked if there is any scheduled digital image left to be checked regarding risk for image quality loss due to planning a position of the digital image at the beginning or at the end of the input roll. If so, the method proceeds to a sixth step T6 via an intermediate point C in FIG. 7 and FIG. 8. If not so, the method returns to the fourth step T4.

In the sixth step T6 (See FIG. 8) a lengthwise position on the web of the input roll is determined at which lengthwise position the digital image will be printed. The lengthwise position may be determined by a start point and an end point in the length direction of the web or a start point and a length size of the digital image in the length direction of the web when printing on the web.

In the seventh step T7 the at least one selected threshold distance is compared to the lengthwise position of the digital image on the web of the input roll.

In an eighth step T8 it is checked if the lengthwise position of the digital image is at least partially overlapping with the beginning respectively end of the input roll within the at least one predetermined threshold distance. If so, the method proceeds to an ninth step T9. If not so, the method returns to the fifth step T5 via intermediate point D.

In the ninth step T9 the flag is set to 1, i.e. meaning there is a problem detected with respect to loss of image quality.

In a tenth step T10 the planned digital image is moved in the print queue towards the middle of the web at a risk-free area of the web regarding said digital image. To determine the risk-free area and the corresponding position in the print queue, the calculations in the eighth step T8 may be repeated after each move until it is determined that there is no risk anymore. The method returns to the fifth step T5 via intermediate point D.

According to an embodiment in order to assure that the method ends in the end point B, a limiting threshold on the number of iterations of the fourth step T4 is embedded in the method. When the threshold is reached, the user interface will display a warning that the print queue order will probably lead to image quality loss for a certain job. The certain job may be mentioned in the warning. The operator may then decide to take the risk or to leave out the mentioned print job or a digital image of the mentioned print job or to replace a print job or a digital image by another print job or by another digital image respectively in order to eventually arrive at a risk-free print queue order.

According to another embodiment of the invention the threshold distances of the images in the print queue 500 are retrieved from the media list 400 as shown in FIG. 6 and the images are firstly ordered on increasing threshold distance for the beginning of the input roll as shown in a first ordered list 1000 in FIG. 10 and secondly on decreasing threshold distance for the end of the roll as shown in a second ordered list 1100 in FIG. 10. By combining the two ordered lists 1000, 1100 of images from the print queue 600, a proposal of an ordered print queue 1200 is established by an elementary sorting and merging algorithm. Then each image in the ordered print queue 1200 is checked again on image quality risk according to the eighth step T8 of FIG. 9. If there is still an image quality risk, the user interface displays a message that this set of images cannot be printed without any image quality loss.

According to an embodiment the method also comprises the step of printing the images according to the risk-free ordered print queue by the print engine.

The flow diagram in FIGS. 8-9 is merely exemplary. Combination of the flow diagram in FIGS. 8-9 with other embodiments of the method according to the invention may be envisioned, even provided with additional steps according to the embodiments of the printing systems according to the invention and according to the embodiment of the methods according to the invention which are described here-above.

The above disclosure is intended as merely exemplary, and not to limit the scope of the invention, which is to be determined by reference to the following claims.

The invention claimed is:

1. A printing system for printing a plurality of images on a web, the printing system comprising:
   a) a print engine;
   b) a feeder for feeding the web to the print engine in a feed direction relative to said print engine;
   c) a receiver for receiving a printed web;
   d) a user interface configured to set a printing arrangement of the plurality of images on the web and to provide input to the print engine, the feeder and the receiver, so that a printing operation is performed according to the printing arrangement by ejecting marking material on the web; and
   e) a scheduling module for scheduling the plurality of images to be printed on the web; and
   f) a media list of media types in a storage,
   wherein each media type in the list is associated with at least one predetermined distance, and the scheduling module is configured to move an image of the plurality of images in the printing arrangement from an originally planned location of the web to a new location of the web such that a distance of the new location to an end of the web, which is an end closest in distance to the originally planned location, is larger than the at least one predetermined distance, and
   wherein the at least one predetermined distance is a predetermined distance with respect to an end of the web at which printing is started or a predetermined distance with respect to an end of the web at which printing is ended.

2. The printing system according to claim 1, wherein the scheduling module is configured to move the image after a warning and/or advice is communicated to an operator of the printing system by means of the user interface of the printing system.

3. The printing system according to claim 1, wherein the at least one predetermined distance for a media type is defined for a finishing action which is applicable to the printed image after printing.

4. The printing system according to claim 1, wherein the at least one predetermined distance for a media type is defined for a print mode of the printing system which is applicable to the printed image during printing.

5. The printing system according to claim 1, wherein the at least one predetermined distance for a media type is defined for an image content type of the image to be printed.

6. The printing system according to claim 1, wherein the scheduling module is configured to move the image of the plurality of images in the printing arrangement from an originally planned location of the web to a new location of the web such that a distance of the new location to each end of the web is larger than the corresponding predetermined distance.

7. The printing system according to claim 1, wherein the receiver is one out of a group of a wrap up unit for wrapping up the web to form an output roll and a cutter for cutting the web into sheets.

8. The printing system according to claim 1, wherein the at least one predetermined distance is linearly dependent of a diameter of an input roll comprising the web.

9. A method for printing a plurality of images with a printing system comprising a print engine, the method comprising the steps of:
   a) setting an arrangement of the plurality of images on the web in a printing arrangement by means of a user interface of the printing system;
   b) the user interface providing input to the print engine, the feeder and the receiver for performing printing according to the printing arrangement by ejecting marking material on the web;
   c) feeding the web to the print engine in a feed direction relative to said print engine for performing printing according to the printing arrangement;
   d) receiving the printed web in a receiver of the printing system,
   wherein the printing system comprises in a storage a media list of media types, each media type in the list comprising at least one predetermined distance, and the method further comprises the step of
   e) moving an image of the plurality of images in the printing arrangement from an originally planned location of the web to a new location of the web before printing of the image such that a distance of the new location of the web to an end of the web, which is an end closest in distance to the originally planned location, is larger than the at least one predetermined distance,
   wherein the at least one predetermined distance is a predetermined distance with respect to an end of the web at which printing is started or a predetermined distance with respect to an end of the web at which printing is ended.

10. A non-transitory recording medium comprising computer-executable program code configured to instruct a scheduling module of a printing system and a computer to perform a method according to claim 9.

11. The printing system according to claim 3, wherein the scheduling module is configured to move the image after a warning and/or advice is communicated to an operator of the printing system by means of the user interface of the printing system.

12. The printing system according to claim 3, wherein the scheduling module is configured to move the image of the plurality of images in the printing arrangement from an originally planned location of the web to a new location of the web such that a distance of the new location to each end of the web is larger than the corresponding predetermined distance.

13. The printing system according to claim 3, wherein the receiver is one out of a group of a wrap up unit for wrapping up the web to form an output roll and a cutter for cutting the web into sheets.

14. The printing system according to claim 3, wherein the at least one predetermined distance is linearly dependent of a diameter of an input roll comprising the web.

* * * * *